US009781729B2

(12) United States Patent
Wang et al.

(10) Patent No.: US 9,781,729 B2
(45) Date of Patent: Oct. 3, 2017

(54) DYNAMIC SPECTRUM ACCESS METHOD, CORRESPONDING DEVICE, COMPUTER PROGRAM PRODUCT

(71) Applicant: Orange, Paris (FR)

(72) Inventors: Dongyan Wang, Beijing (CN); Lin Zhang, Beijing (CN); Nick Sampson, Bristol (GB)

(73) Assignee: ORANGE, Paris (FR)

(*) Notice: Subject to any disclaimer, the term of this patent is extended or adjusted under 35 U.S.C. 154(b) by 196 days.

(21) Appl. No.: 14/652,975

(22) PCT Filed: Dec. 16, 2013

(86) PCT No.: PCT/IB2013/002939
§ 371 (c)(1),
(2) Date: Jun. 17, 2015

(87) PCT Pub. No.: WO2014/118592
PCT Pub. Date: Aug. 7, 2014

(65) Prior Publication Data
US 2015/0334719 A1  Nov. 19, 2015

(30) Foreign Application Priority Data

Dec. 17, 2012  (CN) .................. PCT/CN2012/086802

(51) Int. Cl.
*H04W 4/00* (2009.01)
*H04W 72/08* (2009.01)
(Continued)

(52) U.S. Cl.
CPC ............. *H04W 72/082* (2013.01); *H04L 1/00* (2013.01); *H04W 4/021* (2013.01); *H04W 24/10* (2013.01);
(Continued)

(58) Field of Classification Search
None
See application file for complete search history.

(56) References Cited

U.S. PATENT DOCUMENTS 8,977,274 B2    3/2015   Sadek et al.
9,591,457 B1*   3/2017   Peterson ............. H04W 64/003
(Continued)

FOREIGN PATENT DOCUMENTS

CN    102378190 A    3/2012
CN    102612041 A    7/2012
(Continued)

OTHER PUBLICATIONS

J. Riihijärvi and R. Agusti, "Flexible and Spectrum Aware Radio Access through Measurements and Modelling in Cognitive Radio Systems" in the context of the project FARAMIR (a European FP7 project), Apr. 30, 2011.
(Continued)

*Primary Examiner* — Phirin Sam
(74) *Attorney, Agent, or Firm* — David D. Brush; Westman Champlin & Koehler, P.A.

(57) ABSTRACT

A method is provided for enabling a requesting access node to use at least one radio frequency associated to at least one wireless communication network having at least one connected access node. Such method includes the following acts executed by a frequency access manager in the wireless communication network: retrieving at least one piece of data related to the at least one connected access node and related to the requesting access node; determining a mutual interference information between the requesting access node and the at least one connected access node in function of the at least one piece of data related to the at least one connected access node and related to the requesting access node; and transmitting, to the requesting access node of a frequency (Continued)

access data in function of the determined mutual interference information.

15 Claims, 18 Drawing Sheets

(51) Int. Cl.
  *H04W 24/10*   (2009.01)
  *H04W 4/02*   (2009.01)
  *H04L 1/00*   (2006.01)
  *H04W 72/04*   (2009.01)
  *H04W 74/00*   (2009.01)

(52) U.S. Cl.
  CPC ...... *H04W 72/0453* (2013.01); *H04W 74/004* (2013.01)

(56) References Cited

U.S. PATENT DOCUMENTS

| | | | |
|---|---|---|---|
| 2006/0083205 A1 | 4/2006 | Buddhikot et al. | |
| 2009/0190541 A1 | 7/2009 | Abedi | |
| 2009/0191906 A1 | 7/2009 | Abedi | |
| 2011/0110254 A1* | 5/2011 | Ji | H04W 36/0066 370/252 |
| 2012/0309384 A1* | 12/2012 | Faerber | H04W 72/082 455/422.1 |
| 2013/0132854 A1* | 5/2013 | Raleigh | G06F 3/0482 715/738 |
| 2013/0142129 A1* | 6/2013 | Rinne | H04W 24/00 370/329 |
| 2013/0223240 A1* | 8/2013 | Hayes | H04W 28/0231 370/252 |
| 2015/0117386 A1* | 4/2015 | Tan | H04W 16/14 370/329 |
| 2015/0195858 A1* | 7/2015 | Jin | H04L 41/5051 370/230 |
| 2015/0215367 A1* | 7/2015 | Hayes | H04W 28/0231 370/238 |
| 2015/0341983 A1* | 11/2015 | Kakkad | H04W 8/183 455/552.1 |
| 2016/0242042 A1* | 8/2016 | Brisebois | H04W 24/02 |

FOREIGN PATENT DOCUMENTS

| | | |
|---|---|---|
| EP | 2096889 A1 | 9/2009 |
| EP | 2503815 A1 | 9/2012 |
| EP | 2552144 A1 | 1/2013 |

OTHER PUBLICATIONS

Document S1-113150 during 3GPP TSG SA1_56#_San Francisco, Nov. 2011.

International Search Report and Written Opinion dated Jun. 5, 2014 for corresponding International Application No. PCT/IB2013/002939, filed Dec. 16, 2013.

International Search Report and Written Opinion dated Sep. 2, 2013 for corresponding Chinese International Application No. PCT/CN2012/086802, filed Dec. 17, 2012.

\* cited by examiner

ⓘ : interface $i(1 \leq i \leq 10)$ between two modules
NMS: Network Management System
REP: Radio Evaluation Platform
LSDe: Licensed Spectrum Database engine
DT: Drive Test
Fsan: Flexible Spectrum access node

Figure 3:
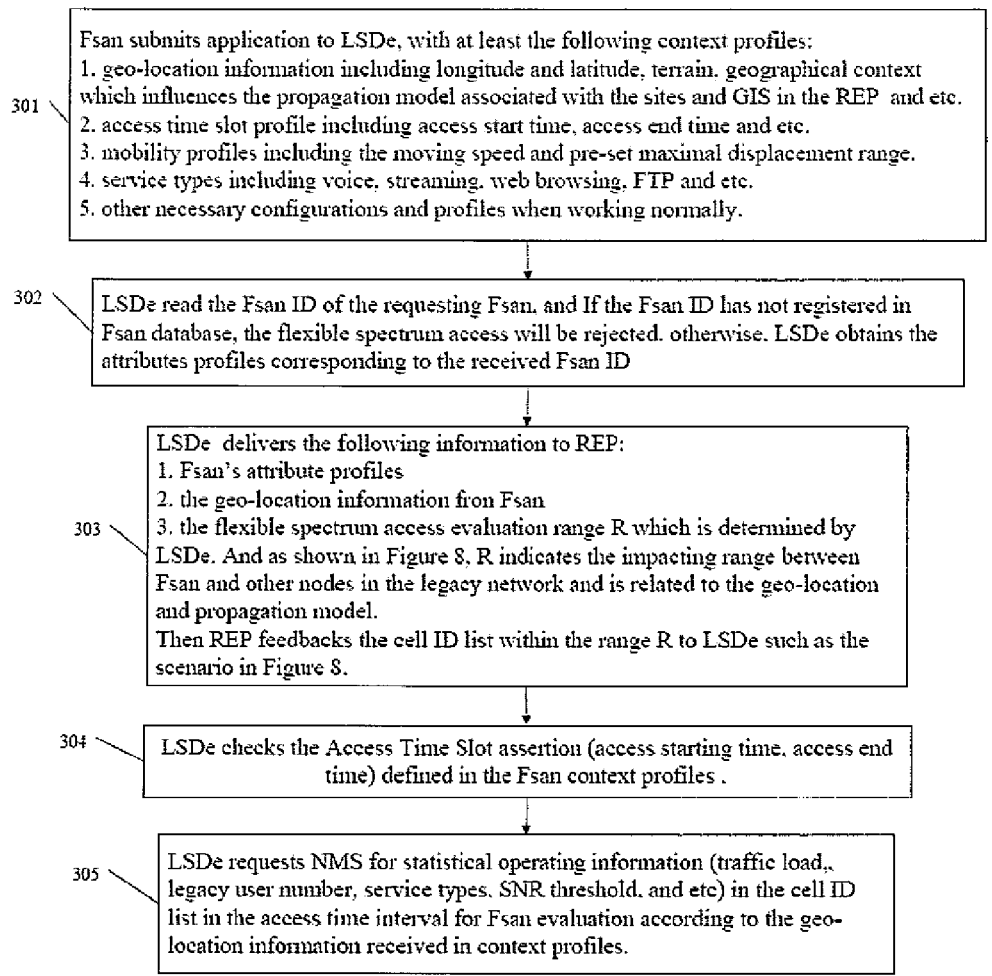

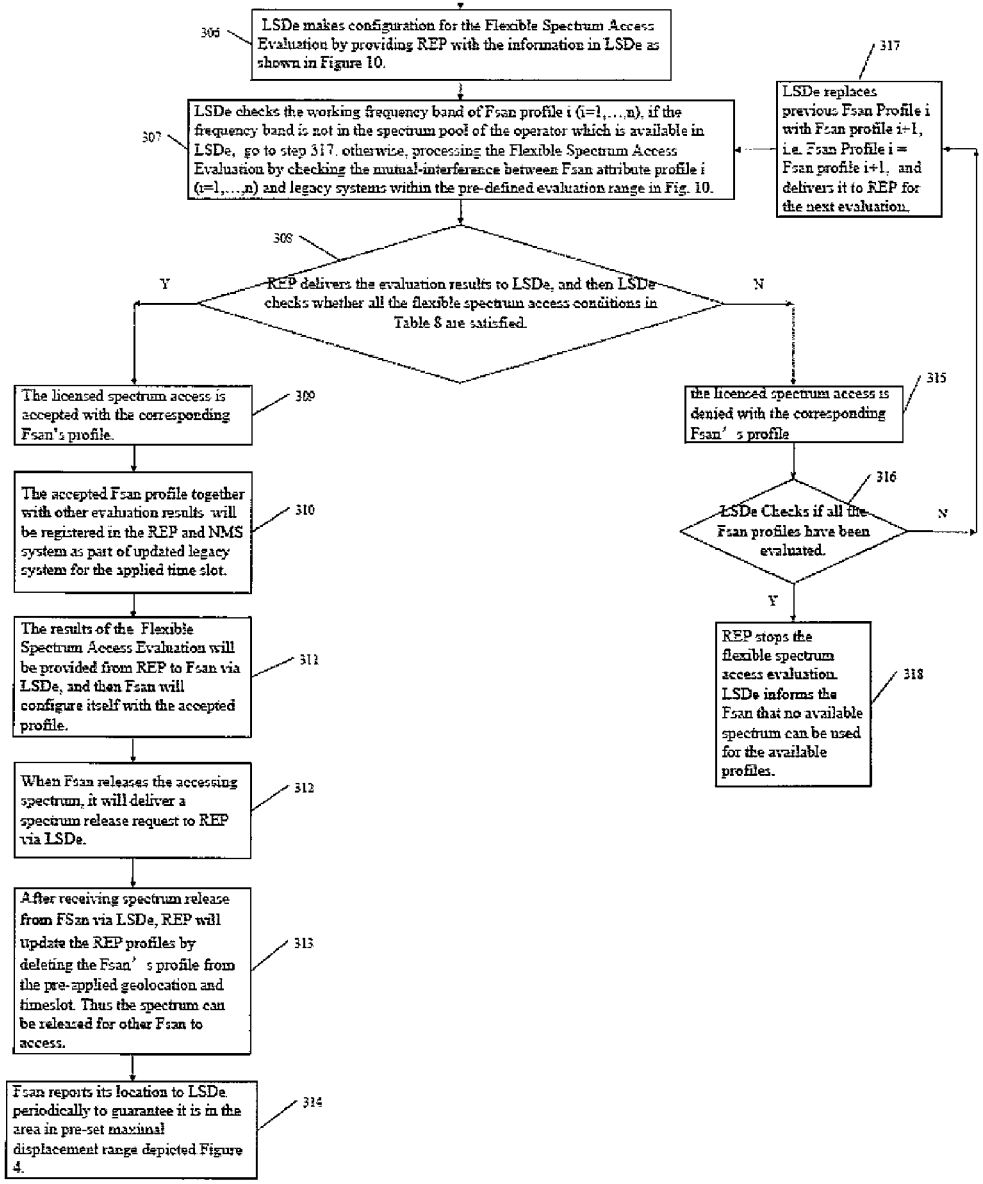
Figure 3 (Continuation)

| Profiles | | | Specific Values |
|---|---|---|---|
| Attributes Profiles | Transmitter profiles | emission mask or ACLR | |
| | | working bandwidth | |
| | | Working frequency | |
| | | maximum transmission power level | |
| | | Antenna number | |
| | | Antenna polarization | |
| | Receiver profiles | working bandwidth | |
| | | Working frequency | |
| | | receiver sensitivity | |
| | | ACS | |
| | | Antenna number | |
| | | Antenna polarization | |
| Context profiles | Requested access time slot | Access start time | |
| | | Access end time | |
| | Mobility | Moving speed | |
| | | Pre-set maximal displacement range D | |
| | Geo-location information | longitude | |
| | | latitude | |
| | | Geographical context | |
| | Service | Service type | |
| | | User number | |

Figure 5

| Profiles | | | Specific Values |
|---|---|---|---|
| Attributes Profiles | Transmitter profiles | emission mask or ACLR | X1 |
| | | working bandwidth | 10MHz |
| | | Working frequency | f1 |
| | | maximum transmission power level | X2 |
| | | Antenna number | 2 |
| | | Antenna polarization | Vertical |
| | Receiver profiles | working bandwidth | 10MHz |
| | | Working frequency | f1 |
| | | receiver sensitivity | X3 |
| | | ACS | X4 |
| | | Antenna number | 2 |
| | | Antenna polarization | Vertical |
| Context profiles | Requested access time slot | Access start time | t1 (GMT) |
| | | Access end time | t2 (GMT) |
| | Mobility | Moving speed | 10km/hour |
| | | Pre-set maximal displacement range D | X5 |
| | Geo-location information | longitude | X6 |
| | | latitude | X7 |
| | | Geographical context | indoor |
| | Service | Service type | voice |
| | | User number | X8 |

Figure 6

| Profiles | | | Specific Values |
|---|---|---|---|
| Attributes Profiles | Transmitter profiles | emission mask or ACLR | X1 |
| | | working bandwidth | 10MHz |
| | | Working frequency | f2 |
| | | maximum transmission power level | X2 |
| | | Antenna number | 2 |
| | | Antenna height | 20m |
| | | Antenna polarization | Vertical |
| | Receiver profiles | working bandwidth | 10MHz |
| | | Working frequency | f2 |
| | | receiver sensitivity | X3 |
| | | ACS | X4 |
| | | Antenna number | 2 |
| | | Antenna polarization | Vertical |
| Context profiles | Requested access time slot | Access start time | t1 (GMT) |
| | | Access end time | t2 (GMT) |
| | Mobility | Moving speed | 10km/hour |
| | | Pre-set maximal displacement range D | X5 |
| | Geo-location information | longitude | X6 |
| | | latitude | X7 |
| | | Geographical context | indoor |
| | Service | Service type | Voice |
| | | User number | X8 |

Figure 7

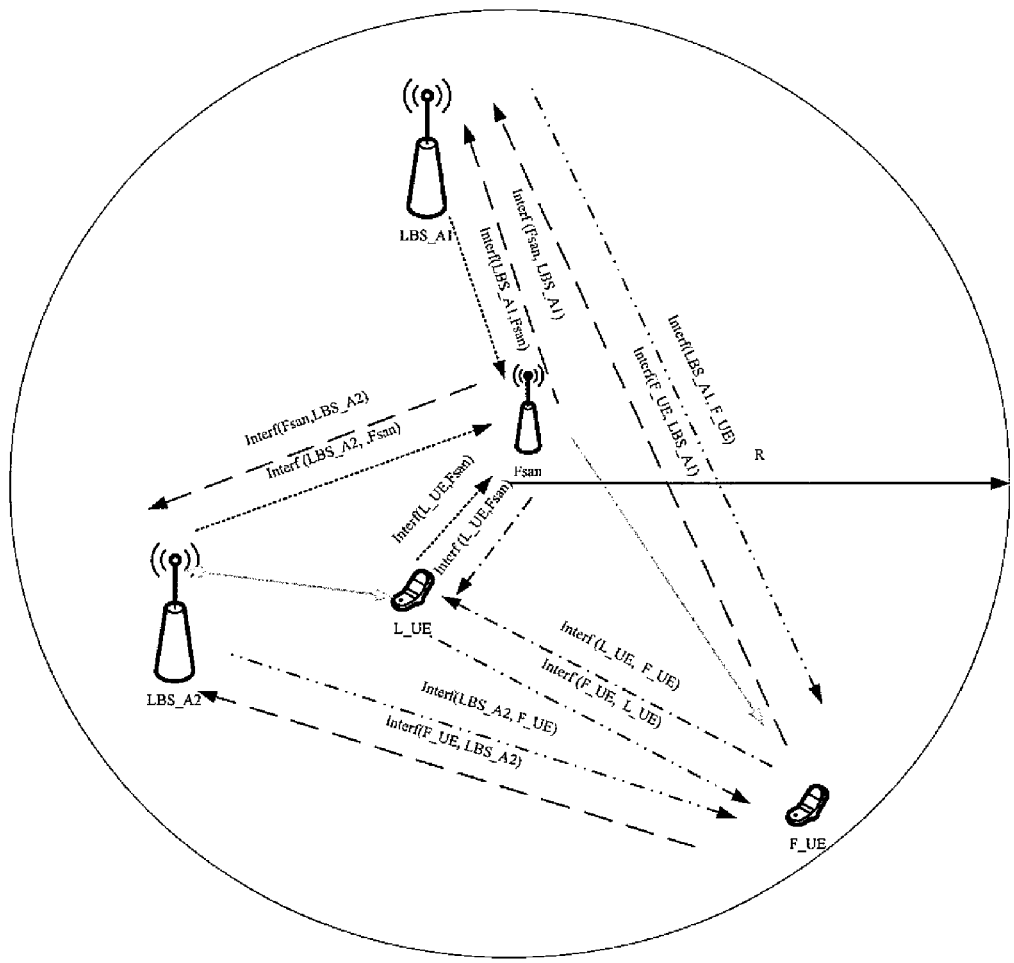

LBS_Ai represents the ith legacy base station of operator A
Fsan represents flexible spectrum access node
F_UE represents Fsan user equipment
L_UE represents legacy user equipment — — — — represents Desired signal link (uplink and downlink)
Interf(i, Fsan)
·············▶ represents the interference from legacy layer to Fsan
Interf(i, F_UE)
— ·· — ·· — ·▶ represents the interference from legacy layer to F_UE
Interf(F_UE/Fsan, L_UE)
— · — · — · ▶ represents the interference from Fsan layer to L_UE
Interf(F_UE/Fsan, LBS_Ai)
— — — ▶ represents the interference from Fsan layer to LBS_Ai

Figure 8

| cell: k | | | | | |
|---|---|---|---|---|---|
| Time | Voice /User number | streaming/User number | web browsing/User number | FTP/User number | SNR threshold |
| t1~t2 | X1_1/N1_1 | X1_2/N1_2 | X1_3/N1_3 | X1_4/N1_4 | X1_5/ X1_6 |
| t2~t3 | X2_1/N2_1 | X2_2/N2_2 | X2_3/N2_3 | X2_4/N2_4 | X2_5/ X2_6 |
| t3~t4 | X3_1/N3_1 | X3_2/N3_2 | X3_3/N3_3 | X3_4/N3_4 | X3_5/ X2_6 |
| ... | ... | ... | ... | ... | ... |

Figure 9

| Partial legacy system profiles | Statistical operating profiles | Traffic load |
| --- | --- | --- |
| | | Legacy user number |
| | | Service types |
| | | SNR thresholds |
| Fsan profiles | Fsan attribute profiles | transmitter profiles including working frequency (f1, f2, f3...), bandwidth, output power, emission mask, ACLR and etc |
| | | receiver profiles including working frequency (f1, f2, f3...), bandwidth blocking characteristics, ACS and etc. |
| | Fsan Context profiles | geo-location information including longitude and latitude, terrain and etc. |
| | | access time slot profile including access start time, access end time and etc. |
| | | mobility profiles including the moving speed and pre-set maximal displacement range. |
| | | other necessary configurations and profiles when working normally. |

Figure 10

| Interference from Fsan system to legacy system layer | Type1 | the interference from Fsan to the legacy base stations when Fsan is acting as an aggressor. |
|---|---|---|
| | Type2 | the interference from Fsan to the legacy UEs when Fsan is acting as an aggressor. |
| | Type3 | the interference from Fsan UEs to the legacy base stations when eachFsan UE is acting as an aggressor. |
| | Type4 | the interference from Fsan UEs to the legacy UEs when each Fsan UE is acting as an aggressor. |
| Interference from Legacy system layer to Fsan system | Type1 | the interference from the legacy base stations to Fsan when Fsan is working as a victim. |
| | Type2 | the interference from the legacy UEs to Fsan when Fsan is working as a victim. |
| | Type3 | the interference from the legacy base stations to Fsan UEs when each Fsan UE is working as a victim. |
| | Type4 | the interference from the legacy UEs to Fsan UEs when each Fsan UE is working as victim. |

Figure 11

| SNR threshold of legacy system | Type1 | The threshold th_LB of legacy base stations. |
|---|---|---|
| | Type2 | The threshold th_LU of legacy UEs. |
| SNR threshold of Fsan system | Type1 | The threshold th_F of Fsan. |
| | Type2 | The threshold th_FU of Fsan UE. |

Figure 12

| Condition1 | Type1 | The threshold th_LB can be satisfied under the sum of the following interference<br>1. interference from Fsan to the legacy base stations when Fsan is acting as an aggressor<br>2. Interference from Fsan UEs to the legacy base stations when each Fsan UE is acting as an aggressor.<br>3. Interference from legacy system |
|---|---|---|
| | Type2 | The threshold th_LU can be satisfied under the sum of the following interference<br>1. Interference from Fsan to the legacy UEs when Fsan is acting as an aggressor<br>2. interference from Fsan UEs to the legacy UEs when each Fsan UE is acting as an aggressor.<br>3. Interference from legacy system |
| Conditions 2 | Type1 | The threshold th_F can be satisfied under the sum of the following interference<br>1. Interference from the legacy base stations to Fsan when Fsan is working as a victim<br>2. Interferencefrom the legacy UEs to Fsan when Fsan is working as a victim.<br>3. Interference from Fsan system |
| | Type2 | The threshold th_FU can be satisfied under the sum of the following interference<br>1. interference from the legacy base stations to Fsan UEs when each Fsan UE is working as a victim<br>2. interference from the legacy UEs to Fsan UEs when each Fsan UE is working as victim.<br>3. Interference from Fsan system |

Figure 13

Figure 15:
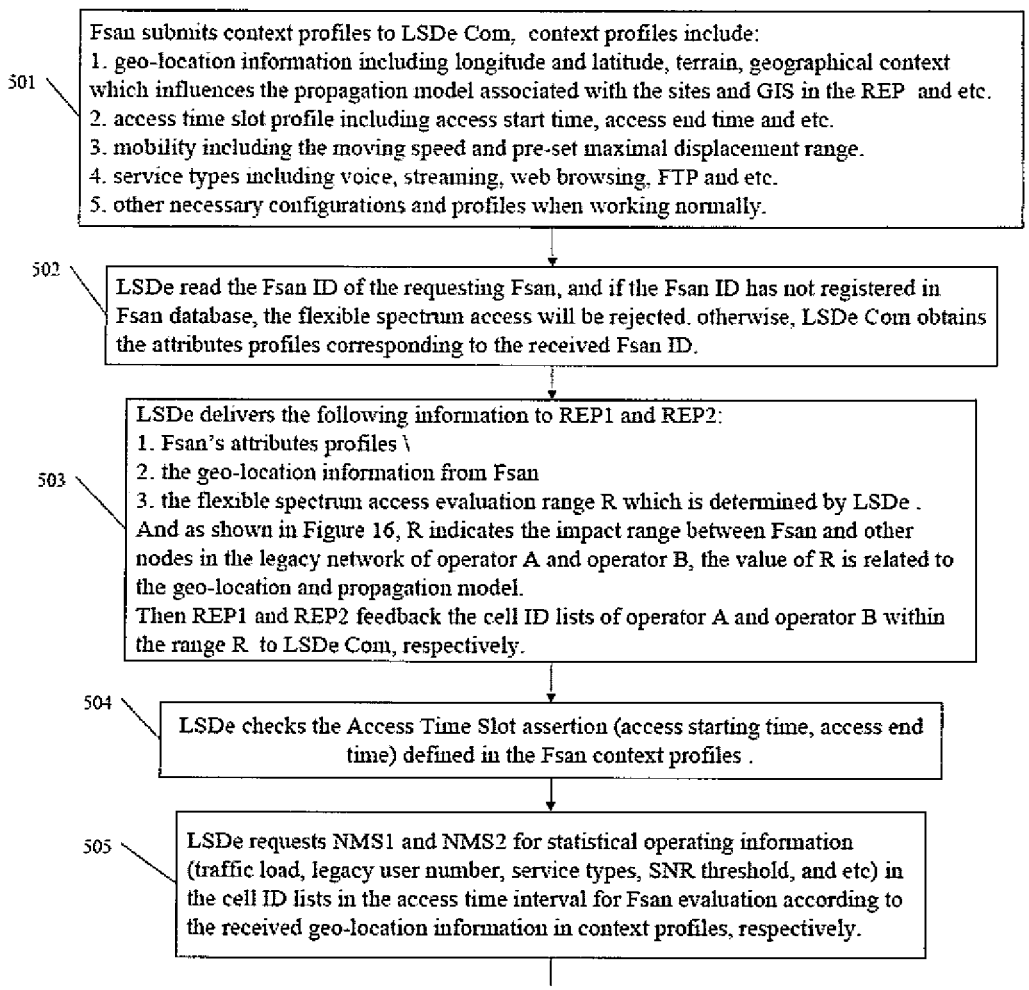

Figure 15 (Continuation)

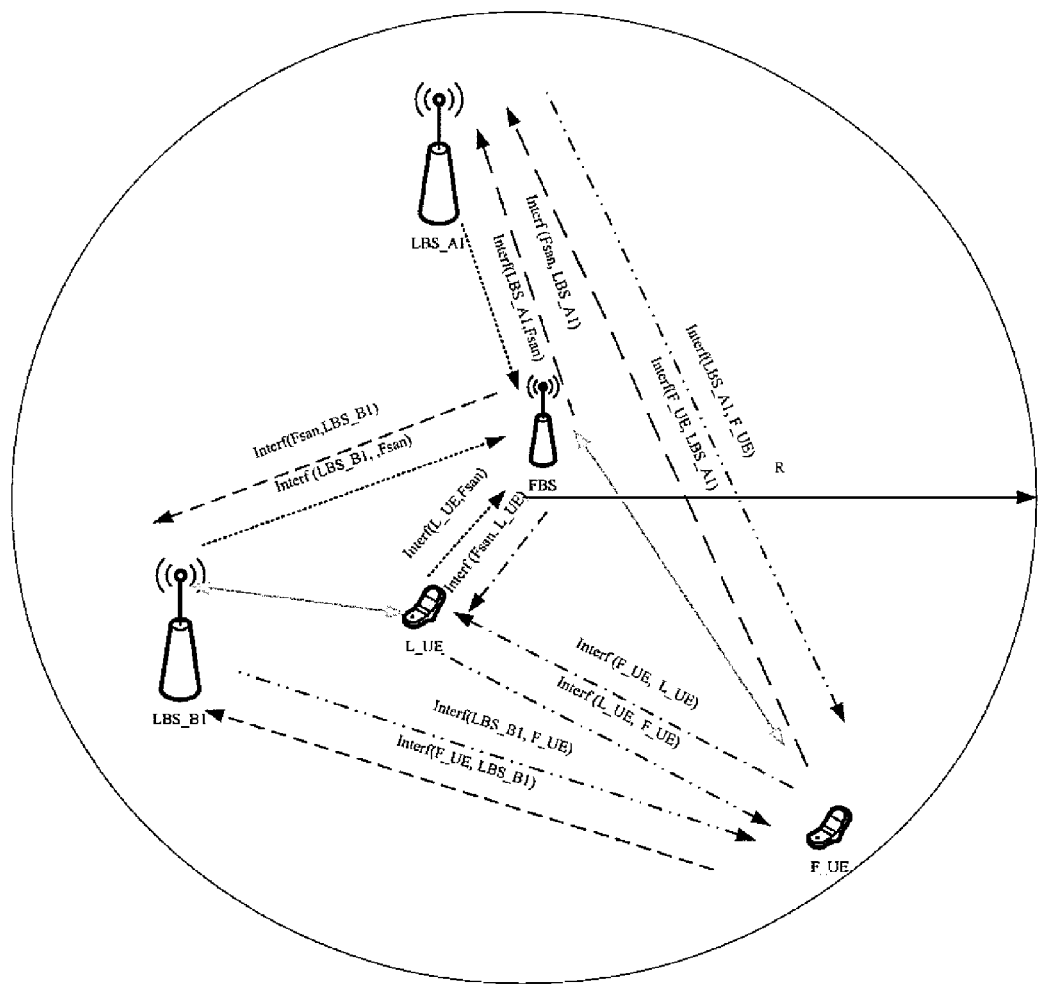

LBS_Ai represents the ith legacy base station of operator A

LBS_Bi represents the ith legacy base station of operator B

Fsan represents flexible spectrum access node

F_UE represents Fsan user equipment

L_UE represents legacy user equipment

| | represents Desired signal link (uplink and downlink) |
|---|---|
| Interf(i, Fsan) ──────▶ | represents the interference to Fsan |
| Interf(i, F_UE) ─ ·· ─ ·· ─ ▶ | represents the interference to F_UE |
| Interf(i, L_UE) ─ · ─ · ─ · ─ ▶ | represents the interference to L_UE |
| Interf(i, LBS_Ai) ── ── ── ▶ | represents the interference to LBS_Ai |
| Interf(i, LBS_Bi) ─ ─ ─ ─ ─ ▶ | represents the interference to LBS_Bi |

Figure 16

DYNAMIC SPECTRUM ACCESS METHOD, CORRESPONDING DEVICE, COMPUTER PROGRAM PRODUCT

1. CROSS-REFERENCE TO RELATED APPLICATIONS

This application is a Section 371 National Stage Application of International Application No. PCT/IB2013/002939, filed Dec. 16, 2013, the content of which is incorporated herein by reference in its entirety, and published as WO 2014/118592 on Aug. 7, 2014, in English.

2. FIELD OF THE INVENTION

The field of the invention is that of wireless communications networks.

More specifically, the invention pertains to a technique for dynamic spectrum access for example in cellular networks.

The invention can be applied in a wide range of technologies notably but not exclusively in the implementation of the specifications of the 3GPP (for "3rd Generation Partnership Project") standards: GSM, UMTS (for "Universal Mobile Telecommunications System"), LTE (for "Long Term Evolution").

3. TECHNOLOGICAL BACKGROUND

A key-defining characteristic of an MNO (which stands for "Mobile Network Operator") is that an MNO must own or control access to a radio spectrum license obtained from a regulatory or government entity. A second key defining characteristic of an MNO is that an MNO must own or control the elements of the network infrastructure that are necessary to provide services to subscribers over the licensed spectrum. But, obtaining such licensed spectrum is a main issue for a company usually acting as a mobile network operator, which wants for example to offer new services and technologies (such as the 4G). Indeed, the process for obtaining such licensed spectrum is scarce and very expensive and extensive deployment of the new technology network also means large investment, and therefore need to consider the network sharing to overcome the this problem in order to reach adequate coverage at the initial launch of the new technologies.

In order to overcome this issue, under network sharing framework, several MNO may decide to share a licensed spectrum (such technique is called network sharing) and even some infrastructure elements including RBS (for "Radio Base Station"), RNC (for "Radio Network Controller"), BSC (for "Base Station Controller"), MSC (for "Mobile Switching Center"), SGSN (for "Serving GPRS Support Node"), and MME (for "Mobile Management Entity") depending on the different network sharing scenarios. By implementing such a network sharing, the MNO may reduce their capital expenditure (CAPEX) by jointly using the infrastructure of the shared network, as well as cut operational expenditure (OPEX) by performing operations together.

Thus more and more MNO picture network sharing as a mechanism capable of ensuring future cost competitiveness and environment protection in the industry.

Hence, an MNO, owning a radio spectrum license may provide a dynamic spectrum access and management technique to the subscribers of an operator company under network sharing agreement (generally called secondary users compared to the primary users which are the subscribers of the MNO sharing its spectrum). Such dynamic spectrum access and management technique can be applied either in a context where there is only one MNO (which is called the intra-operator context), or either in the context where there are effectively at least two MNO which share a spectrum (which is called the inter-operator context or inter-operator network sharing agreement framework).

A first technique described in the document entitled "FlexibleandSpectrumAwareRadioAccessthroughMeasurementsandModellinginCognitiveR adioSystems" edited by J. Riihijärvi and R. Agustí in the context of the project FARAMIR (a European FP7 project) consists in establishing and using a Radio Environment Map (REM), which is a database, in order to speed up a spectrum sensing process within a dynamic spectrum access method. More precisely, such database comprises information on the radio environment of the shared network, including geographical features of the shared network, available services, spectrum policies of the MNO and regulations, location and activities of radio devices connected to the shared network, past experiences etc. Hence, such database enables to obtain a spectrum cartography of the shared network which combines measurements performed by different network entities (mobile terminals, base stations, access points) with geo-location information of theses network entities and runs simple and effective spatial interpolation techniques to achieve a map which indicates the level of interference experienced at each mesh over the area of interest.

Hence, a device of secondary user computes some parameters related to its emission power in order to prevent interference due to the attachment of the device of the secondary user to the network. Such task which can be quite time consuming is also a issue when several devices wants to access to the spectrum at the same time.

So far REM is intended to be used for intra-operator case, provides dynamic geo-located measurements on request, collected from every RAT domain that are stored and treated in the REM entity (encompassing REM management and storage modules). The post-treated REM data is then provided to the RRM (Radio Resource Management) entities for radio resources optimization purposes.

So the key contribution of REM is to improve the REM database by combining sensing and postpone processing. No clear procedures on how to access it by secondary users so far.

A second technique is described in the document U.S. 61/413,775 which discloses a wireless communication device of a secondary user, that transmits a geo-localization information to a database and requests information regarding primary users and available frequencies in the shared network. Such device comprises a geo-localization module 301, and such database can be stored either in an access point of the mobile operator network 1250, in the macro cell access point 1260, or in a femto node. It appears that such database provides to the wireless communication device the requested information. Therefore, the wireless communication device, after receiving such information, may adjust one or more parameters of the sensing module 305 of the wireless communication device. Then the processing module may determine the presence or absence of a device of a primary user based on the sensing.

However, the use of such technique, as the one related to the use of a REM, implies that a device of secondary user/device has to compute some parameters related to its emission power in order to prevent interference due to the attachment of a device of the secondary user to the shared network. Moreover, such technique doesn't work properly for dense access scenarios from secondary users due to apparent dynamic radio environment, dynamic traffic load, indoors and outdoors complex propagation model, and also variant radio performance of the devices of the primary users and of the devices of the secondary users. Another drawback of such technique, especially with the use of only a geo-localization information of the device of the secondary user, is that such geo-localization information may not be accurate (due to wrong position measurements). Therefore, the database could deliver to the device of the secondary user erroneous information about available frequencies or available communication channels.

Indeed, the technologies provided in priori arts mainly deals with database provisioning, no adequate architecture and mechanism to support the appropriate access from a new access points due to lacking of the knowledge in the said database on for example, operating profiles of the legacy nodes, radio profiles of different access nodes surround the new access points. Therefore the database have to leave large margin to protect the legacy users, and therefore when dense access points apply to access the spectrum in the same location, there is little opportunity to accommodate many access points with interference exempt principle.

Moreover, these techniques have other drawbacks. Indeed, it has been identified in doc S1-113150 during 3GPP TSG SA1_56#_San Francisco, November 2011, that within the inter-operator network sharing agreement framework, the resource allocated to each operator is in general pre-defined, within a cellular network, where both the cell referenced A and the target cell referenced B are shared among three operators. For example:

Operator 1 owns 40% of the spectrum;
Operator 2 owns 40% of the spectrum;
Operator 3 owns 20% of the spectrum.

If cell B is less loaded than cell A, and operator 1 has already used all its available share in cell B (i.e. 40%), operator 1 in cell A may not be able to offload any traffic in cell B if pre-defined resource allocation has been made, so that the users severed by operator 1 in cell B may suffer severe congestion even outage while some of the resources of operator 1 in cell A are idle. Thus the existing pre-defined static resource allocation scheme has some limitation on system performance and user experience.

In another example, a heterogeneous network with macro cells and HeNBs overlay, especially the HeNBs generally deployed in the residential area, it could be used depending on the life schedule of the people, that is, not permanently online, therefore in general may not need to be assigned with fixed frequency resources.

And in general, the resource management for HeNBs is separated from the resource management of the Macro layer based on the existing network architecture in 3GPP, in which the HeNB will be managed by H(e)MS, and configured by Configuration Management (CM), while NMS is taking the responsibility to manage the Macrolayer network elements. Thus even during the night, some spectrum on macrocell layer could be released when the base stations on macro cell layer enter into the energy saving mode, there is still constraints to all the unused spectrum and applied for HeNBs. Therefore there is need to set up a unified spectrum management entities.

Hence, there is a need to develop a technique, which facilitates the flexible spectrum access for both intra-operator scenario and inter-operator scenario within the licensed spectrum under network sharing context.

4. SUMMARY OF THE INVENTION

A particular embodiment of the invention proposes a method for enabling a requesting access node to use at least one radio frequency associated to at least one wireless communication network comprising at least one connected access node. Such method is remarkable in that the method comprises, executed by a frequency access manager comprised in said wireless communication network, the following steps of:

retrieving at least one piece of data related to said at least one connected access node and related to said requesting access node;

determining a mutual interference information between said requesting access node and said at least one connected access node in function of said at least one piece of data related to said at least one connected access node and related to said requesting access node;

transmitting, to said requesting access node of a frequency access data in function of said determined mutual interference information Hence, such method allows a better management of the frequency resources. Indeed, it combines and uses more information than technique used in prior art in order to provide a better method for enabling a requesting access node to use at least one radio frequency associated to at least one wireless communication network.

According to a particular feature, such method is remarkable in that said data retrieving step comprises at least one step among the following steps:

obtaining a supported frequency of said requesting access node comprised within at least one profile associated to said requesting access node;

obtaining at least one piece of geo-location data comprised within at least one profile associated to said requesting access node;

determining a set of connected access nodes in a neighborhood of said requesting access node from at least one piece of geo-location data;

obtaining, for at least one connected access node comprised within said set of connected access nodes, an associated profile;

obtaining at least a state parameter of said at least one wireless communication network within said neighborhood;

obtaining at least one piece of access time slot data comprised within at least one profile associated to said requesting access node.

A node comprised within said set may not have any direct connection with the requesting access node.

According to a particular feature, such method is remarkable in that said profile associated to an access node comprises an attribute profile and a context profile, said attribute profile being related to a configuration of intrinsic features of said access node, and said context profile being related to a configuration of extrinsic features of said access node.

Indeed, intrinsic features of said access node are features relatives to physical properties of said access node. For example, an attribute profile can comprise at least one of the following elements:

a transmitter profile comprising at least one of the followings elements:
an emission mask represented by the value of an adjacent channel leakage ratio;
one or several values of a working frequency;
one or several values of a working bandwidth;
a maximum transmission power level;
an number of antenna;
an height for each antenna;
a polarization position for each antenna;

a receiver profile comprising at least one of the followings elements:
  one or several values of working bandwidth;
  one or several values of working frequency;
  a value related to a receiver sensitivity;
  a value which determines the adjacent channel selectivity;
  an number of antenna.

Whereas, extrinsic features of said access node are features relatives to external properties of said access node. For example, said context profile comprises said geo-location data associated to a position of said access node, which comprises at least one of the following elements:
  a longitude;
  a latitude;
  a geographical context.

Moreover, said context profile further comprises at least one of the following elements:
  a requested access time slot which comprises at least one of the following elements:
    an access start time;
    an access end time;
  a mobility profile which comprises at least one of the following elements:
    a moving speed;
    a pre-set maximal displacement range D;
  a service profile which comprises at least one of the following elements:
    a service type;
    a user number.

Let's remark that said state parameters of said at least one wireless communication network comprises at least one of the followings elements:
  a traffic load;
  a set of services types;
  a set of signal threshold;
  power control schemes; and
  channel configuration schemes.

According to a particular feature, such method is remarkable in that said attribute profile is obtained from a database comprised in said frequency access manager.

According to a particular feature, such method is remarkable in that said attribute profile is obtained directly from said requesting access node.

According to a particular feature, such method is remarkable in that said context profile of said requesting access node is obtained from said requesting access node and said context profile of said at least one connected access node comprised within said set of connected access nodes is obtained from a database comprised in said frequency access manager. According to a particular feature, such method is remarkable in that it comprises a step of verifying a presence of a profile associated to said requesting access node in a database comprised in said frequency access manager, said step of verifying being executed before said data retrieving step.

According to a particular feature, such method is remarkable in that when an attribute profile associated to said requesting access node being stored in the database, said method further comprises a step delivering said attribute profile associated to said requesting access node.

According to a particular feature, such method is remarkable in that said transmitting step consists in comparing said determined mutual interference information with at least two thresholds; if said determined mutual interference information is inferior to said at least two thresholds, said frequency access manager allows said requesting access node to use said at least one frequency.

According to a particular feature, such method is remarkable in that if said determined mutual interference information is superior to said at least two thresholds said frequency access data denies said requesting node to use said at least one frequency if all supported frequencies of said requesting access node have been processed during said data retrieving step.

According to a particular feature, such method is remarkable in that it comprises a step transmitting to said requesting access node, said frequency access data which enables to configure said requesting access node, and a step of registering an information that said requesting access node is a connected access node within said at least one wireless communication network. According to a particular feature, such method is remarkable in that when said requesting access node uses said at least one frequency associated to said at least one wireless communication network, the methods further comprises a step of periodically receiving reports of at least one piece of geo-location data of said requesting access node.

According to a particular feature, such method is remarkable in that said determining step delivering a mutual interference information comprises at least one step among the following steps:
  determining an interference from said requesting access node, to said at least one connected access node;
  determining an interference from said requesting access node, to at least one user equipment connected to said at least one connected access node;
  determining an interference from at least one user equipment, connected to said requesting access node, to said at least one connected access node;
  determining an interference from at least one user equipment, connected to said requesting access node, to at least one user equipment connected to said at least one connected access node;
  determining an interference from said at least one connected access node to said requesting access node;
  determining an interference from at least one user equipment connected to said at least one connected access node, to said requesting access node;
  determining an interference from said at least one connected access node to at least one user equipment connected to said requesting access node;
  determining an interference from at least one user equipment connected to said at least one connected access node, to at least one user equipment connected to said requesting access node.

According to a particular feature, such method is remarkable in that that said at least one frequency is associated to several wireless communication networks, and in that each frequency access manager comprised in a wireless communication network comprises at least one common shared device, which belongs to each of said several wireless communication networks.

A particular embodiment of the invention proposes a frequency access manager of at least one frequency associated to at least one wireless communication network comprising at least one connected access node, characterized in that it comprises:
  data retrieving means delivering at least one piece of data related to said at least one connected access node and related to a requesting access node;

determining means delivering a mutual interference information between said requesting access node and said at least one connected access node in function of said at least one piece of data related to said at least one connected access node and related to said requesting access node;

a transmitting means, enabling to transmit a frequency access data in function of said determined mutual interference information, to said requesting access node.

According to a particular feature, such frequency access manager is remarkable in that it comprises:

a licensed spectrum database engine, which receives said access request from said requesting access node;

an enhanced network management system, which provides state parameter of said at least one wireless communication network to said licensed spectrum database engine;

a radio evaluation platform, which comprises said determining means;

a drive test unit, which provides specific measures to said radio evaluation platform in order to enhance an accuracy of said mutual interference information;

said licensed spectrum database engine being directly connected to said radio evaluation platform, and said enhanced network management system, and said drive text unit being directly connected to said radio evaluation platform.

In another embodiment, the invention pertains to a computer program product comprising program code instructions for implementing the above-mentioned method (in any of its different embodiments) when said program is executed on a computer or a processor.

In another embodiment, the invention pertains to a non-transitory computer-readable carrier medium, storing a program which, when executed by a computer or a processor causes the computer or the processor to carry out the above-mentioned method (in any of its different embodiments).

5. LIST OF FIGURES

Figure 1:
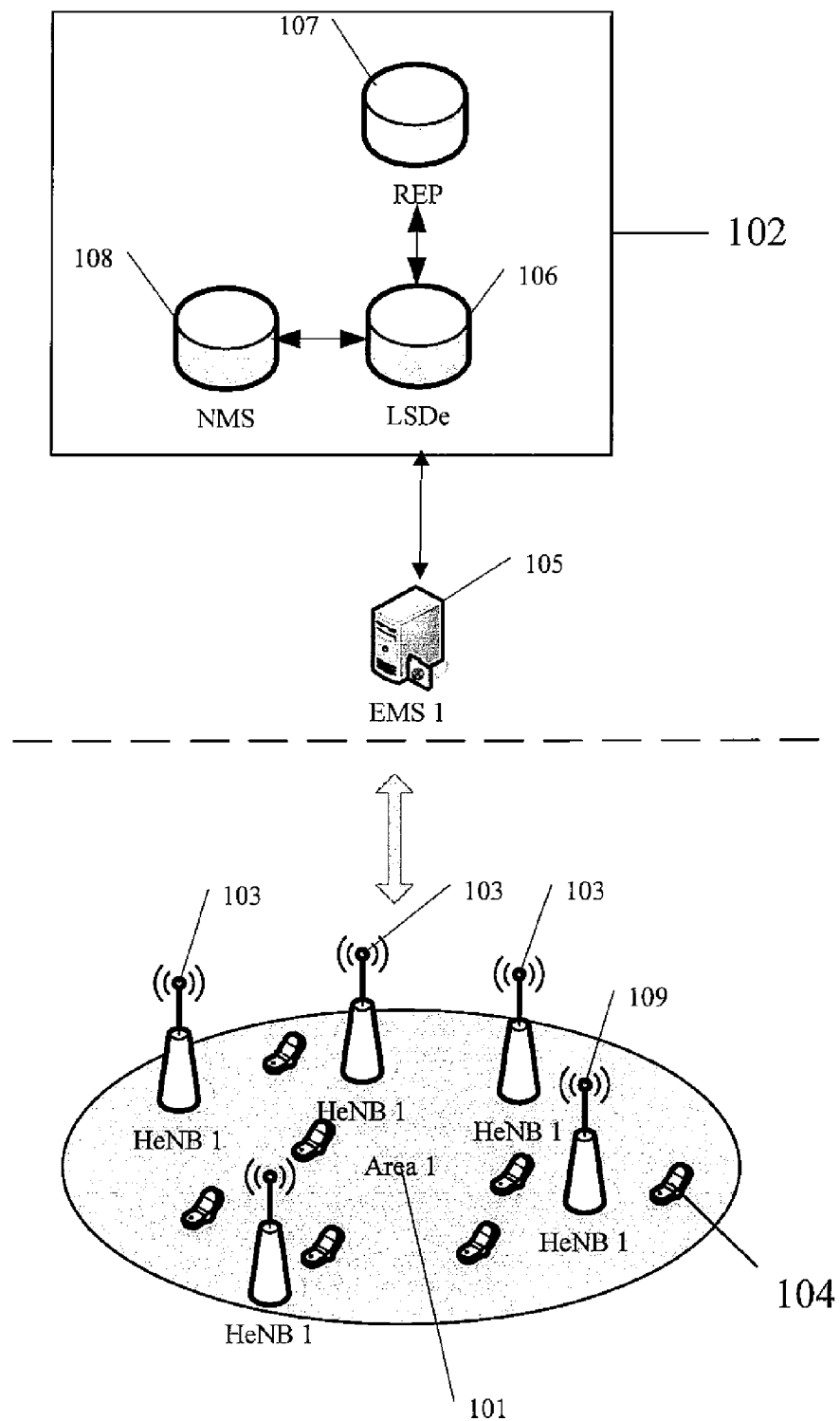
Figure 2:
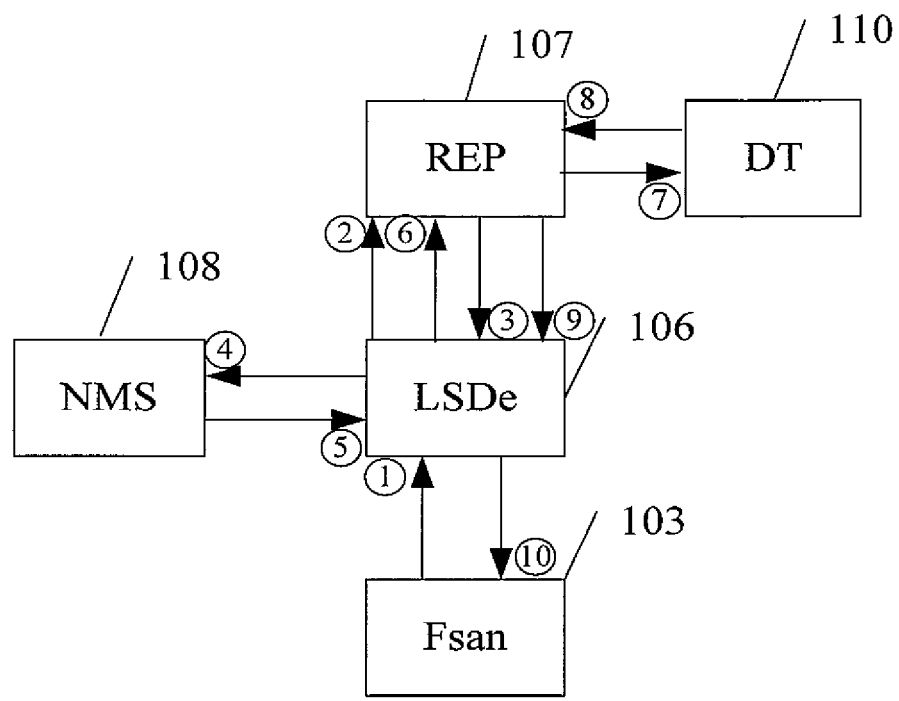
Figure 4:
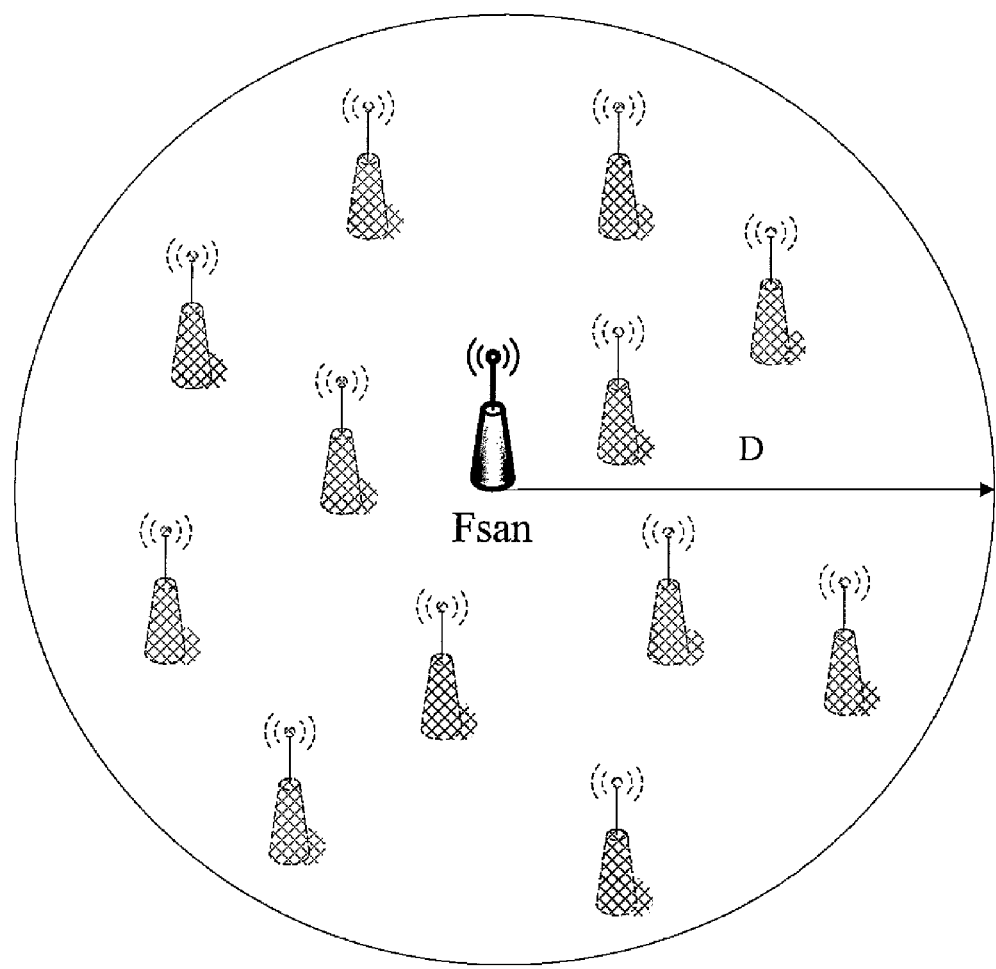

Other features and advantages of embodiments of the invention shall appear from the following description, given by way of an indicative and non-exhaustive examples and from the appended drawings, of which:

FIG. 1 presents an architecture of a network managed by one MNO enabling a dynamic spectrum access for requesting access nodes in a intra-operator context, according to one embodiment of the invention;

FIG. 2 presents in a schematic way, the interactions between the devices comprised within a frequency access manager as depicted in the FIG. 1;

FIG. 3 presents steps of the dynamic spectrum access method according to one embodiment of the invention, in an intra-operator context;

FIG. 4 presents an example of pre-set maximal displacement range D centered around a current requesting access node location;

FIG. 5 presents an example of a profile template associated to an access node according to one embodiment of the invention;

FIG. 6 presents an example (referenced with values) of a profile associated to an access node according to one embodiment of the invention;

FIG. 7 presents an example (referenced with values) of another profile associated to the same access node as the one of FIG. 6, according to one embodiment of the invention;

FIG. 8 discloses some evaluations tasks performed in a step of determining a mutual interference in a range R, according to one embodiment of the invention, in an intra-operator context;

FIG. 9 discloses some examples of statistic operating information database associated to a cell k;

FIG. 10 discloses some examples of statistical operating profiles for the said cell list in legacy network layer and Fsan profiles.

Figure 14:
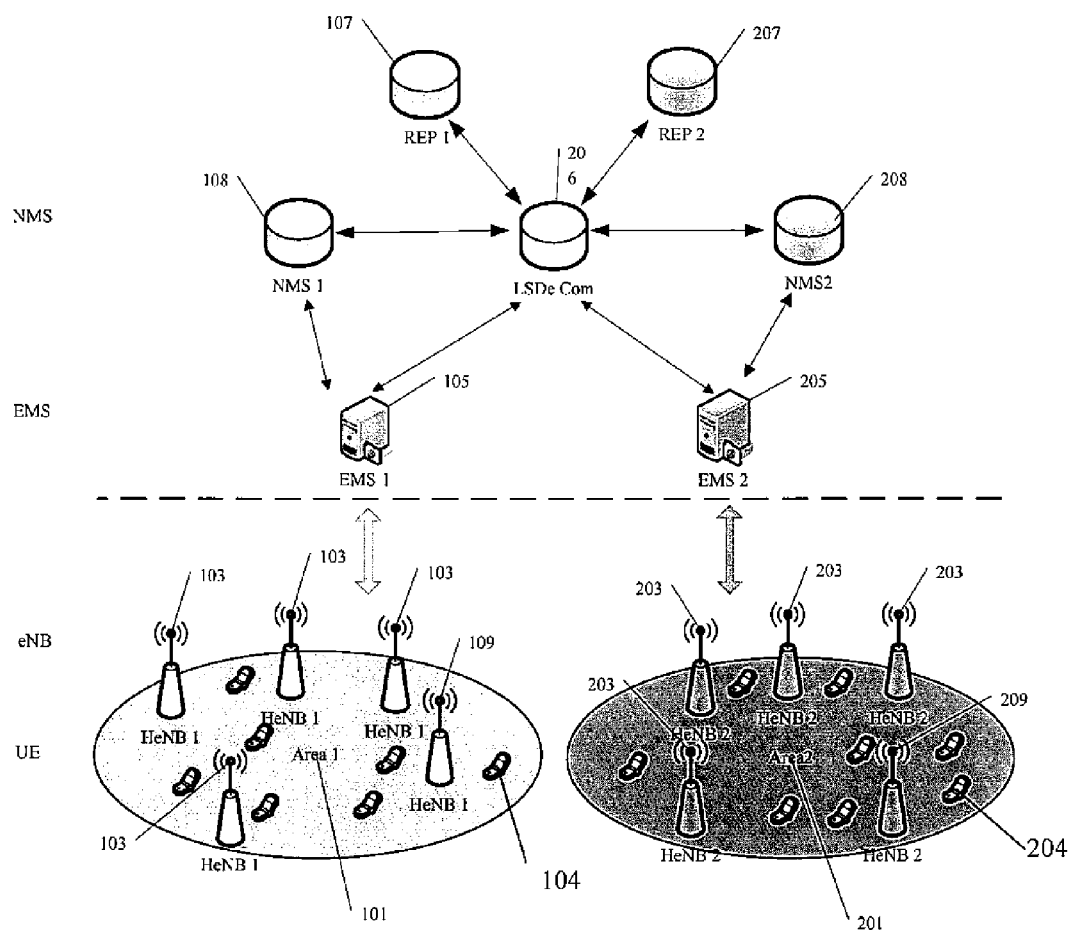
Figure 16:
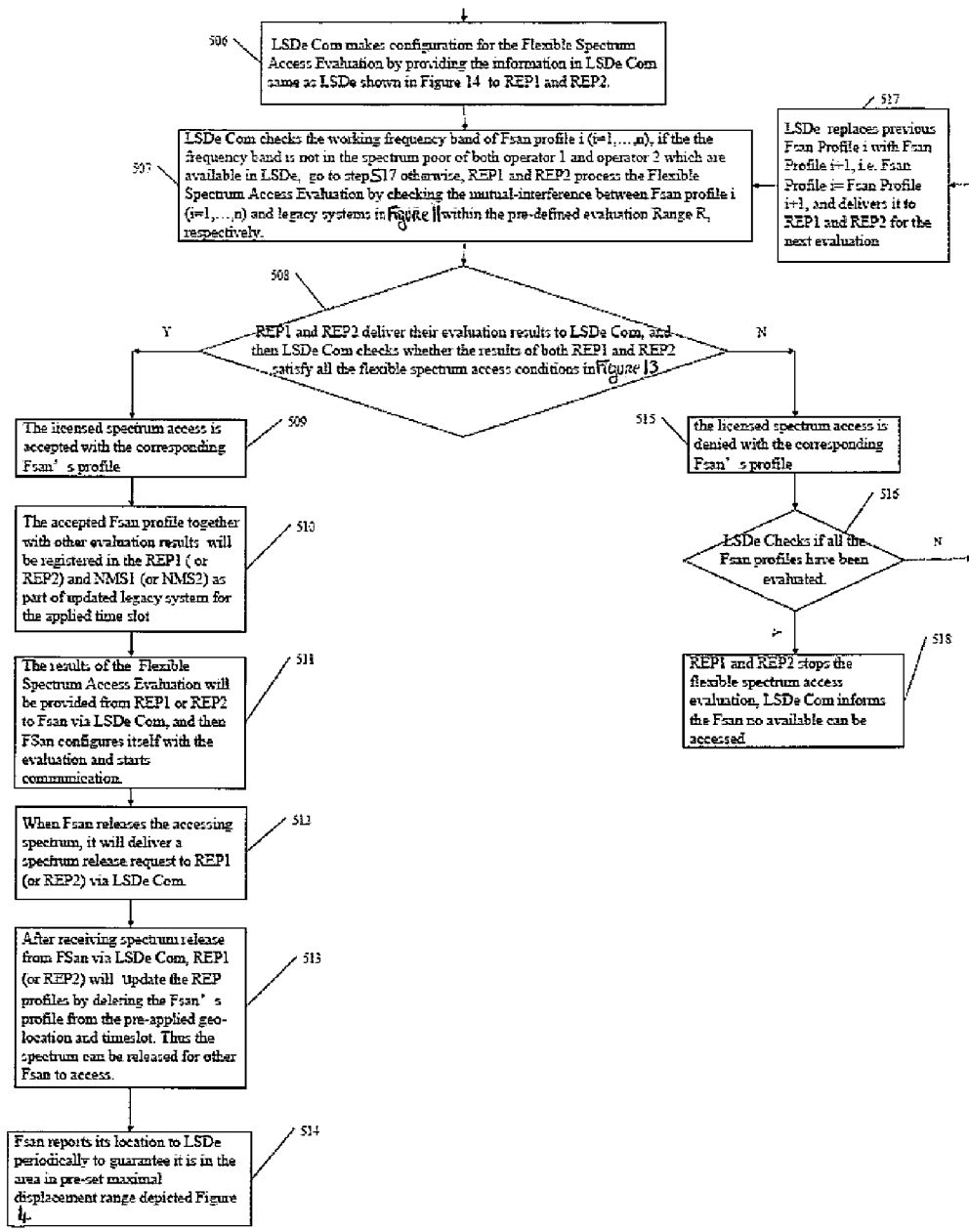

FIG. 11 discloses a classification of the interference between legacy system layer (comprising the connected access nodes, as well as the user equipments connected to these connected access nodes) and requesting node system (comprising a requesting access node and user equipments connected to such requesting access);

FIG. 12 discloses threshold sets of both legacy system layer and requesting node system;

FIG. 13 discloses some conditions used to compare the determined mutual interference with threshold;

FIG. 14 presents an architecture of a network managed by two MNOs enabling dynamic spectrum access for requesting access nodes in a inter-operator context;

FIG. 15 presents steps of the dynamic spectrum access method according to one embodiment of the invention, in an inter-operator context;

FIG. 16 presents some evaluations tasks performed in a step of determining a mutual interference in a range R, according to one embodiment of the invention, in an inter-operator context.

Figure 17:
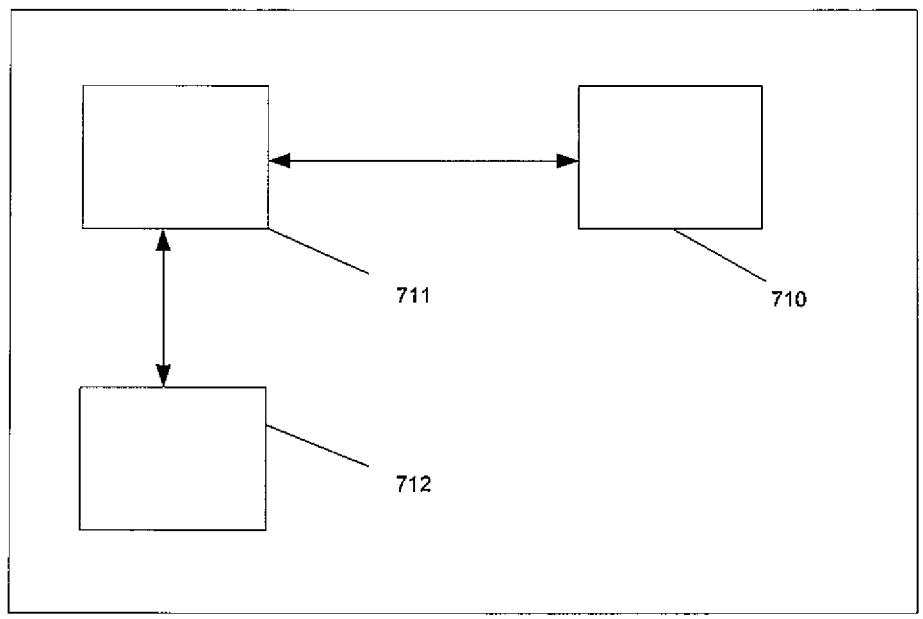

FIG. 17 presents a device capable of executing a particular embodiment of the invention.

6. DETAILED DESCRIPTION

In all of the figures of the present document, identical elements and steps are designated by the same numerical reference sign.

Let's remark that a requiring access node which requests to use a radio frequency associated to at least one wireless communication network will also be named a Fsan (which stands for "flexible spectrum access node") in the description.

The FIG. 1 presents an architecture of a network managed by one MNO enabling dynamic spectrum access for requesting access nodes in an intra-operator context.

More precisely, the FIG. 1 depicts a cellular network comprising at least one cell, referenced 101, and a core network comprising a frequency access manager, referenced 102, according to the present invention. The cell 101, which is identified by an identifying data, comprises several HeNB (which stands for "Home evolved Node B"), referenced 103, which are also called Femtocell access points. Those HeNB 103 enable' a user equipment, referenced 104, as well as requesting access node (HeNB), referenced 109, to access via a radio link, to the core network, via an element management system (or EMS), referenced 105.

The frequency access manager 102, which enables to enhance the dynamic spectrum access, comprises a licensed Spectrum Database engine (or LSDe), referenced 106, combined with a Radio Evaluation Platform (or REP), referenced 107, and an enhanced Network Management System (or NMS), referenced 108.

The LSDe 106 communicates with the REP 107 and NMS 108 in response to a demand from a Fsan (for example the requesting access node 109) which wants to access to a part of the spectrum provided by the MNO.

With the help of the LSDe, the spectrum access capability of Fsan in specific location and specific time slot can be evaluated by the REP for each of the concerned profile of the Fsan. The different types of interference measured between the already connected access nodes 103 and Fsan can be evaluated before such decision is made.

an operator's REP is with capability to support single-mode and multi-mode (e.g. GSM, UMTS and LTE) deployment in which the coverage may overlap with each other in some specific area. In some cells of the network, single-mode transmission techniques and multi-mode transmission techniques can be used simultaneously, that is to say the same cell can serve a UE using a single-mode transmission technique and at the same time serve a UE using a multi-mode transmission technique. The REP is capable of supporting such situations.

In traditional network architecture, the radio coverage planning is implemented in REP before the deployment of the access nodes 103 on sites and is based on geo-location information for the specific region, transmitter and receiver models and reference traffic models in different regions. The REP is not able to be accessed online by any network elements during the network operation, therefore the coverage forecast in REP does not represent the real coverage due to the apparent fluctuations of the traffic in different cells and potential energy saving strategies during the less usage hours, e.g., night.

The FIG. 2 represents in a schematic way, the interactions between the devices comprised within a spectrum access management system 102 as depicted in the FIG. 1.

The architecture disclosed in the FIG. 2 is remarkable in that it uses the following entities: a Licensed Spectrum Database engine (LSDe) 106 in connection with a Fsan 103, a REP 107 and a enhanced Network Management System 108 with detail description as following:

Fsan 103 is an entity that is capable to access the intra-operator spectrum resource, or inter-operator spectrum resources for licensed spectrum access under some pre-defined agreements, and it can deliver as pectrum request information to LSDe, and provide LSDe with are quested Fsan ID (i.e. an identifying information of the Fsan) and Fsan context profiles (as depicted for example in FIGS. 5, 6 and 7). Fsan ID is used to retrieved the overall Fsan Profiles from a Fsan Database in the LSDe or can be accessed by the Fsan via an external interface. And the Fsan profiles includes at least:

Transmitter profiles including working frequency (f1, f2, f3 . . . ), bandwidth, output power, emission mask, ACLR (which stands for "Adjacent Channel Leakage Ratio") and etc.

Receiver profiles including working frequency (f1, f2, f3 . . . ), bandwidth blocking characteristics, ACS (which stands for "Adjacent Channel Selectivity") and etc.

And the Fsan context profiles include at least:
a geo-location information of the Fsan comprising longitude and latitude, terrain and etc.
an access time slot profile comprising access start time, access end time and etc.
a mobility profile comprising the moving speed and pre-set maximal displacement range of the Fsan.
Fsan UE number and the distribution range. In one embodiment, Fsan UE's profiles may be taken into account when needed in order to determine a mutual interference information.
Other necessary configurations and profiles when working normally.

LSDe is introduced to communicate with Fsan, NMS, and REP to facilitate the flexible spectrum access evaluation for specific Fsan profiles, including When a Fsan requests for flexible spectrum access, Fsan ID and Fsan context profiles are transmitted from Fsan to LSDe.

When Fsan request for flexible spectrum access, statistical operating information of the network is transmitted from NMS to REP via LSDe.

If Fsan is admitted by LSDe, admission information including admitted Fsan profile indication is transmitted from LSDe to Fsan.

If Fsan is rejected by LSDe, rejection information including rejection indication is transmitted from LSDe to Fsan.

The enhanced NMS provides generic functionalities such as:
Performance management functions;
Configuration management functions;
Security management functions;
Accounting management functions;
Fault management functions;
and enhanced functionalities such as a feedback from enhancement NMS to LSDe with statistic operating information (traffic load, service types, QoS level, and legacy UE number and etc.) for the set of cells within the Evaluation range R.

The REP has the capability to implement flexible spectrum access evaluation for a specific profile of Fsan within intra-operator's or inter-operator spectrum resource under the context of legacy sites profiles, where the context information include statistic operating information (traffic load, number of user equipments and etc.) for the set of cells within the Evaluation range R and profiles of the legacy layer (RX (which stands for "reception") and TX (which stands for "transmission") profiles, geo-location of sites), with pre-set thresholds defined in LSDe.

Thanks to the known profiles for the deployed access nodes (such as base stations for GSM, UMTS and LTE) and UE (User equipment), by using the REP 107 in communication with LSDe 106, the interference between Fsan 103 and the relevant access nodes already deployed in the network can be evaluated, the detailed information will be shown in the subsequent sections.

At last, a DT (Drive Test) unit, referenced 110, is deployed with the capability to enhance the accuracy of REP by offering the correction factors based on the offline measurement to specific locations.

The FIG. 3 represents a dynamic spectrum access method or flexible spectrum access method according to one embodiment of the present invention, in the intra-operator context.

It should be noted that before the execution of such method, an identifying information of an access node also named "Fsan ID" should be registered in a Fsan database (or access node database) offline. The Fsan database can be accessed by LSDe with at least the following attributes profiles:

1. Transmitter profiles including working frequency (f1, f2, f3 . . . ), bandwidth, output power, emission mask, ACLR and etc.

2. Receiver profiles including working frequency (f1, f2, f3 . . . ), bandwidth blocking characteristics, ACS and etc.

Fsan ID is unique, located in Fsan ROM and can not be modified by unauthorized party. In one embodiment of the invention, the Fsan ID can be read by LSDe in a secure way (i.e. it can be encrypted in a access request). With the Fsan ID, LSDe may find the above attributes information in the Fsan database corresponding to a specific Fsan.

Then LSDe obtains the Fsan profiles (which is a merge of a context profile and an attribute profile) in Step 301 and 302:

In the step 301, the Fsan submits an application to LSDe, comprising at least the following context profiles:

1. a geo-location information of the Fsan including longitude and latitude, terrain, geographical context which influences the propagation model of the transmission channel associated with the sites and GIS in the REP, etc.
2. Access time slot profile including access start time, access end time and etc.
3. Mobility profiles including the moving speed and pre-set maximal displacement range D of the Fsan.
4. Service types including voice, streaming, web browsing, FTP and etc.
5. Other necessary configurations and profiles when working normally.

It should be noted that the pre-set maximal displacement range D is required by REP to calculate the average Fsan evaluation results. In another embodiment, such pre-set maximal displacement range D can also be derived from the geo-location information. In one embodiment, the pre-set maximal displacement range is set during Fsan application based on its intended moving scope. And later on should be able to monitored by LSDe by tracking its location. And stop its usage once any violation identified.

For example, knowing the pre-set maximal displacement range D, the REP calculate the average Fsan evaluation assuming that Fsan can be randomly distributed in the area centered with Fsan's current location within radius D depicted in FIG. 4. By this way, the mobility of Fsan is taken into account during the evaluation procedure of the Fsan.

The Fsan is identified by LSDe through the registered unique Fsan ID corresponding to the registered Fsan attributes in Fsan database including hardware version, software version, product number etc. of the Fsan. The Fsan database sorts the Fsans by ID numbers according to their access order. Hence, several profiles can be associated to a unique Fsan ID.

Indeed, the Fsan profiles (profile (i), i=1 . . . n) consist of attributes profiles and context profiles, and they can be categorized into a pre-defined template, one example is shown in FIG. 5, it should be noted that the rightmost column in FIG. 5 is a specific values corresponding to different profiles. Generally, the attributes profiles are pre-stored in Fsan database when registration and context profiles vary with the environment of the Fsan. And optionally, the chosen profiles of a Fsan can be a subset of the whole profiles depending on the usage scenarios and the user specific data, eg. Displacement range D.

It should be noted that different values of any parameter in Fsan profile template correspond to different Fsan profiles. For example, Fsan Profile i shown in FIG. 6 is different from Fsan Profile j shown in FIG. 7 for only working frequencies. Hence, the two Fsan Profiles are in different band while other parameters are identical.

In a Step 302, the LSDe read the Fsan ID of the requesting Fsan, if the Fsan ID is not registered in Fsan database, the flexible spectrum access request ou alors the access to the flexible spectrum will be rejected. Otherwise, LSDe obtains the corresponding attributes profiles from the Fsan database by means of the Fsan ID.

Next, LSDe prepares for flexible spectrum access evaluation by performing steps 303 to Step 305:

In a step 303, the LSDe delivers the following information to the REP:

1. Fsan's attribute profiles
2. the geo-Location information from Fsan
3. the flexible spectrum access evaluation range R which is determined by LSDe. And as shown in FIG. 8, R indicates the impacting range between Fsan and other nodes in the legacy network and is related to the geo-location and propagation model.

Then REP feedbacks a cell ID list within the range R to LSDe according to the scenario represented in FIG. 8.

The flexible spectrum access evaluation range R can be set by the operator for flexible spectrum access evaluation purpose. The flexible spectrum access evaluation range R represents the range within which Fsan and other access nodes (base stations and also the UEs that are in connections with the relevant base stations) already connected to network impact each other.

And the parameter setting is at least related to Fsan's geo-location, propagation model and legacy network profiles etc.

To facilitate the definition of flexible spectrum access evaluation range R, an example of flexible spectrum access evaluation range R is shown in FIG. 8.

Flexible Spectrum access evaluation range R is defined as a radius of a circle with the geo-location of Fsan as a reference center of the circle to evaluate the mutual impact of all the existing access nodes inside the range R on Fsan and vice versa.

As shown in FIG. 8, the mutual impact site information including site ID, longitude, latitude and geographical context are determined based on a given evaluation range R, and the access node Ai (i=1, 2, 3) and corresponding UE are in the legacy network as provided in REP, while Fsan and F_UE is in a virtual layer for evaluating if the co-existence capability can be reached if with inserted Fsan and F_UE in the legacy system layer.

And then REP feedbacks the LSDe with a cell ID list comprised in the flexible spectrum access evaluation range R.

In a Step 304, after obtaining the cell ID list in the pre-set Flexible Spectrum Access Range R, LSDe checks the access time slot assertion (access starting time, access end time) in the Fsan's application.

In a step 305, the LSDe requests NMS for statistical operating information (traffic load, legacy user number, service types, SNR (which stands for "Signal-to-Noise Ratio") threshold, user number and etc) of the cells listed in the cell ID list for the access time interval in order to evaluate the Fsan.

Note the fact that NMS is able to obtain the operating information as defined in 3GPP.

Moreover, in some cases, the operating information could be relatively stable from a statistic point of view, and it may follow a set of rules which are geo-location and temporal dependent. Therefore the statistic operating information could be derived by tracking, for a given period of time, operating information that are be available in NMS, and use them to evaluate the Flexible Spectrum Access.

For example, the traffic load mentioned in operating information in different time slots such as t1~t2, t2~t3, t3~t4 can be arranged in a database as shown in FIG. 9. The statistic database shows the statistic percentage of traffic load for each type of service (voice, streaming, web browsing, FTP and etc) for specific timeslots and specific cells. So that, when LSDe requests NMS for statistical operating information, NMS uses the statistical data to forecast the operating information during the time indicated by Fsan's access assertion.

For example, as shown in FIG. 9, in time slots t1~t2 of cell k, X1_1=20%, X1_2=30%, X1_3=30%, and X1_4=20%. To guarantee the quality of service (Qos) of different services, the minimum SNR requirements of voice, streaming, web browsing and FTP service are SNR1, SNR2, SNR3 and SNR4, respectively. Then LSDe obtains the cell specific SNR threshold based on FIG. 9. The cell specific SNR threshold may be for example, the strictest SNR requirement of legacy system=or the weighted mean of the SNR of the different services provided in the cell.

However, to guarantee a satisfying radio coverage and capacity demand, a baseline SNR threshold is pre-set in each cell. Such a baseline SNR threshold has nothing to do with the traffic load in NMS.

When determining the SNR threshold of legacy a base station X1_5 and that of legacy user equipments X1_6, the policy module in LSDe makes a choice based on either cell specific SNR thresholds or baseline SNR thresholds. Similarly, when determining the thresholds of Fsan, the same method is adopted.

Finally, LSDe starts the flexible or dynamic spectrum access evaluation in the subsequent steps:

In a step 306, after collecting all the necessary information from Fsan and NMS, LSDe checks whether the working frequency band of a specific Fsan profile is in the spectrum pool of REP, if not, LSDe replaces it with another Fsan profile until the working frequency band of a specific Fsan profile falls within the spectrum pool of REP. Otherwise, LSDe delivers both the statistical operating profiles for the said cell list in legacy network layer and Fsan profiles as shown in FIG. 10 to REP in order to start the Flexible Spectrum Access evaluation procedure for the Fsan. The legacy system profiles consist of statistical operating profiles and legacy attribute profiles (attribute of a connected access node), the statistical operating profiles shown in FIG. 10 are delivered to REP by LSDe while the legacy attribute profiles are available in REP, and can be used in flexible spectrum access evaluation procedure.

In a step 307, the REP processes the flexible spectrum access evaluation by checking the mutual interference between Fsan system (which is the requesting access node and the connected UEs to the requesting access node) and the legacy system (which comprises the connected access nodes and the UEs connected to these access nodes) within the flexible spectrum access evaluation range R. For instance, FIG. 8 shows the mutual interference between Fsan system and legacy system in the flexible spectrum access evaluation range R. The impacts between legacy system layer and Fsan system are shown in FIG. 11.

In a step 308, the REP delivers the evaluation results to LSDe, and then LSDe checks whether all the flexible spectrum access conditions in FIG. 13 are satisfied. Note that the thresholds in FIG. 12 are the same as those in FIG. 9.

In a step 309, if all the flexible spectrum access conditions in FIG. 13 are satisfied, the licensed spectrum access is accepted with the corresponding evaluated profile of Fsan.

In a step 315, if all the flexible spectrum access conditions in FIG. 13 are not satisfied simultaneously, the licensed spectrum access is rejected with the corresponding evaluated profile of Fsan.

In a step 310, the accepted Fsan profile is registered in the REP platform and NMS system as part of updated legacy system for the applied time slot.

In a step 316, since the licensed spectrum access is rejected with the corresponding evaluated profile of Fsan, the REP will check whether all the Fsan profiles have been evaluated.

In a step 311, the results of the Flexible Spectrum Access Evaluation will be provided from REP to Fsan via LSDe, and then Fsan will configure itself with the accepted profile.

In a step 318, when the result of the step 316 is that all the Fsan profiles have been evaluated meaning that no Fsan profile can be accommodated in the legacy network, then, the REP stops the flexible spectrum access evaluation. The LSDe informs the Fsan that no available spectrum can be used for the available profiles.

In a step 317, when the result of the step 316 is that there are some Fsan profiles which have not been evaluated, then REP will update the previous Fsan profile with a new one for the next flexible spectrum access evaluation.

In a step 312, when Fsan releases the accessing spectrum, it will deliver a spectrum release request to REP via LDSe.

In a step 313, after receiving spectrum release from Fsan via LSDe, REP updates the REP profiles by deleting the Fsan's profile from the pre-applied geo-location and timeslot. Thus the spectrum can be released for other Fsan to access.

In a step 314, in order to guarantee that the Fsan is in the area of pre-set maximal displacement range D, Fsan reports its location to the REP periodically. If the Fsan is still in the pre-set area, the Fsan continues to access the allocated spectrum with the accepted Fsan profile. Otherwise, the Fsan's access is stopped to protect the legacy system. If the Fsan applies for another access, it should request for flexile spectrum access again.

Although the above procedure only shows the case of static Fsan i.e. the Fsan is not moving, mobile Fsan could also following similar rules as static Fsan, and the use of the history of Fsan can also be recorded for further implementation of the evaluation and approval procedure in LSDe. Meanwhile, the optimization of the procedure may also be possible to pre-evaluate the guard band between the working frequency of the legacy sites and the Fsan, and in the case that sufficient Guard band is available with good isolations between the Fsan and the legacy access nodes, then the evaluation time could be significantly reduced. These pre-evaluation capabilities are included in the REP.

The FIG. 14 discloses an architecture with two MNO enabling dynamic spectrum access for requesting access nodes in a inter-operator context.

In order to achieve the flexible spectrum access under network sharing context, an inter-operator flexible spectrum access sharing architecture is developed as shown in FIG. 14 Although two NMSs are depicted in FIG. 14 for an inter-operator network sharing context, the architecture with converged NMS also applies for inter-operator network sharing context.

In such architecture, a Licensed Spectrum Database engine Common (LSDe Com), referenced 206, is introduced to manage flexible spectrum access with the following example procedure for evaluating whether or not a Fsan (for example the requesting access node 109, or the requesting access node 209) will be accepted into either a shared network under agreement between an MNO A and an MNO B.

The LSDe Com 206 may be a converged licensed spectrum database engine capable to control Fsan's access under both MNO A and MNO B. In another embodiment of the invention, the LSDe Com may be a virtual licensed spectrum engine, which means both operators have their individual licensed spectrum engine, but the two LSDes may share data under some certain pre-achieved agreements between two operators.

Similar to the intra-operator case, before the whole procedure, a Fsan ID is registered in Fsan database which can be accessed by LSDe Com with at least the following attributes profiles:
1. Transmitter profiles including working frequency (f1, f2, f3 . . . ), bandwidth, output power, emission mask, ACLR and etc.
2. Receiver profiles including working frequency (f1, f2, f3 . . . ), bandwidth blocking characteristics, ACS and etc.

Fsan ID is unique, located in Fsan database, and cannot be modified by unauthorized party, but can be read by LSDe Com in a secure way. With the Fsan ID, LSDe Com may find the above context profiles in the Fsan database corresponding to a specific Fsan.

Then LSDe Com obtains the Fsan's profiles in Step 501 and 502:

In a step 501, Fsan submits application to LSDe Com with at least the following profiles:
Geo-location information including longitude and latitude, terrain and etc.
Access time slot profile including access start time, access end time and etc. Mobility including the moving speed and pre-set maximal displacement range.
mobility profiles including the moving speed and pre-set maximal displacement range.
Service types including voice, streaming, web browsing, FTP and etc.
Other necessary configurations and profiles when working normally.

It should be noted that the pre-set maximal displacement range D is required by REP to calculate the average Fsan evaluation results. For example, after given the pre-set maximal displacement range D, the REP will calculate the average Fsan evaluation assuming that Fsan can be randomly distributed in the area centered with Fsan's current location within radius D depicted in FIG. 4. By this way, the mobility of Fsan can be taken into account during the evaluation procedure.

The Fsan profiles (profile (i), i=1 . . . n) consist of attributes profiles and context profiles and they can be categorized into a pre-defined template, one example is shown in FIG. 5. Generally, the attributes profiles are pre-stored in Fsan database when registration and the context profiles vary with the environment. And optionally, the chosen profiles from Fsan can be a subset of the whole profiles depending on the usage scenarios and combined with the user specific data, eg. Displacement range D.

In a step 502, the LSDe Com read the Fsan ID of the requesting Fsan, and if the Fsan ID is not registered in Fsan database, the flexible spectrum access is rejected. Otherwise, LSDe Com obtains the attribute profiles corresponding to the Fsan ID.

In a step 503, the LSDe Com delivers the following information to REP1 and REP2:
1. Fsan's attribute profiles
2. the geo-location information from Fsan
3. Flexible spectrum access evaluation range R, and the flexible spectrum access evaluation range R can be set by the user(operator) in LSDe Com for flexible spectrum access evaluation purpose which indicates the mutual impact range between Fsan and other access nodes (base stations and the UEs that are in connections with the relevant base stations) in the legacy network.

Moreover, the parameter setting is at least related to Fsan's geo-location, propagation model and legacy network profiles and etc.

To facilitate the definition of inter-operator flexible spectrum access evaluation range R, an example of inter-operator flexible spectrum access evaluation range R is shown in FIG. 16.

Flexible Spectrum access evaluation range R is defined as a radius of a circle with the geo-location of Fsan as a reference center of the circle to evaluate the mutual impact of all the existing access nodes inside the range on Fsan and vice versa.

The mutual impact site information including site ID, longitude, and latitude are determined based on a given evaluation range R, and the access node Ai (i=1, 2, 3), and corresponding UE are in the legacy system layer as provided by REP1; the access node Bi (i=1, 2, 3), and corresponding UE are in the legacy system layer as provided by REP2: while Fsan and F_UE is in a virtual layer for evaluating if the co-existence capability can be reached if with inserted Fsan and F_UE in the legacy system layer.

And then REP1 and REP2 feedback the LSDe Com with corresponding cell ID list respectively within the inter-operator flexible spectrum access evaluation range R.

For example, if GSM, UMTS and LTE are available in the legacy system of Operator A, then the cell list will be shown as following:
1. GSM Cell list within the Evaluation Range R for Operator A can be obtained from REP1
2. UMTS cell list within the Evaluation Range R for operator A can be obtained from REP1
3. LTE cell list within the Evaluation Range R for operator A can be obtained from REP1

If GSM and LTE are available in the legacy system of Operator B, then the cell list will be shown as following:
1. GSM Cell list within the Evaluation Range R for Operator B can be obtained from REP2
2. LTE cell list within the Evaluation Range R for operator B can be obtained from REP2

In a step 504, after obtaining the cell ID lists from REP1 and REP2 respectively in the pre-set Flexible Spectrum Access Range, LSDe Com will check the access time slot assertion (access starting time, access end time) in the Fsan's profiles.

In a step 505, the LSDe Com requests NMS1 and NMS2 for statistical operating information (traffic load, legacy user number, service types, SNR threshold, and etc) in the cell ID lists in the access time interval for Fsan evaluation according to the geo-location information received in context profiles, respectively.

In a step 506, after collecting all the necessary information from Fsan, NMS and REP, the LSDe Com will deliver all information shown in FIG. 10 to REP1 and REP2 to evaluate the profiles for Fsan for inter-operator flexible spectrum access.

In a step 507, the LSDe Com checks the working frequency band of Fsan profile i (i=1, . . . , n), if the frequency band is not in the spectrum pool of both REP operator 1 and REP operator 2 which are available in LSDe Com, go to step 517. Otherwise, REP1 and REP2 process the Flexible Spectrum Access Evaluation by checking the mutual-interference between Fsan profile i (i=1, . . . , n) and legacy systems in FIG. 11 within the pre-defined evaluation Range R, respectively.

In a step 508, the REP1 and REP2 deliver their evaluation results to LSDe Com, and then LSDe Com checks whether the evaluation results of both REP1 and REP2 satisfy all the flexible spectrum access conditions in FIG. 13:

Check Condition 1:
whether the integrated impact from legacy network A and B to Fsan system satisfies all the flexible spectrum access conditions in FIG. 13, i.e.

Whether the threshold th_F can be satisfied under the sum of the following interference Interference from the legacy base stations in both operator A and operator B to Fsan when Fsan is working as a victim.

Interference from the legacy UEs in both operator A and operator B to Fsan when Fsan is working as a victim.

Interference from legacy systems.

Whether the threshold th_FU can be satisfied under the sum of the following interference interference from the legacy base stations in both operator A and operator B to Fsan UEs when each Fsan UE is working as a victim Interference from the legacy UEs in both operator A and operator B to Fsan UEs when each Fsan UE is working as victim.

Interference from legacy systems.

Specifically, in FIG. 16, the interference from legacy system of operator A to F_UE is interf(LBS_A1,F_UE), and the interference from legacy system operator B to F_UE is the sum of interf(L_UE,F_UE) and interf(LBS_B1,F_UE).

Thus, the sum interference InterfToFue from legacy systems to Fsan system is the sum of interf(LBS_A1,F_UE), interf(L_UE,F_UE) and interf(LBS_B1,F_UE), the interference from legacy systems here is zero to simplify the description, i.e., $$InterfToFue = interf(LBS\_A1, F\_UE) + interf(L\_UE, F\_UE) + interf(LBS\_B1, F\_UE).$$

Note that the term 'interf(L_UE,F_UE)' denotes the total interference from the user equipments of operator A and operator B to F_UE. However, the interference from user equipments of operator A is zero.

Similarly, the sum interference InterfToFsan from legacy systems to Fsan system is the sum of interf(LBS_A1,Fsan), interf(L_UE,Fsan) and interf(LBS_B1,Fsan), also the interference from legacy systems here is zero to simplify the description, i.e., $$InterfToFsan = interf(LBS\_A1, Fsan) + interf(L\_UE, Fsan) + interf(LBS\_B1, Fsan).$$

Note that the term 'interf(L_UE,Fsan)' denotes the total interference from the user equipments of operator A and operator B to Fsan. However, the interference from user equipments of operator A to Fsan is zero.

Then, LSDe Com will check whether the threshold th_F can be satisfied under the sum interference InterfToFsan and whether the threshold th_FU can be satisfied under the sum interference InterfToFue.

Check Condition 2:
whether the impacts from Fsan system to legacy system of operator A satisfies all the flexible spectrum access conditions in FIG. 13, i.e.

Whether the threshold th_LB can be satisfied under the sum of the following interference interference from Fsan to the legacy base stations in operator A when Fsan is acting as an aggressor.

interference from Fsan UEs to the legacy base stations in operator A when each Fsan UE is acting as an aggressor.

Interference from legacy systems.

Whether the threshold th_LU can be satisfied under the sum of the following interference interference from Fsan to the legacy UEs in operator A when Fsan is acting as an aggressor.

interference from Fsan UEs to the legacy UEs in Operator A when each Fsan UE is acting as an aggressor.

interference from legacy systems.

Specifically, in FIG. 16 the sum interference InterfToLbsa1 from Fsan system to LBS_A1 is the sum of interf(Fsan, LBS_A1) and interf(F_UE,LBS_A1), the interference from legacy systems here is zero to simplify the description, i.e., $$InterfToLbsa1 = interf(Fsan, LBS\_A1) + interf(F\_UE, LBS\_A1).$$

Then, LSDe Com will check whether the threshold th_LB can be satisfied under the sum InterfToLbsa1.

Check Condition 3:
whether the impacts from Fsan system to legacy system of operator B satisfies all the flexible spectrum access conditions in FIG. 13, i.e., Whether the threshold th_LB can be satisfied under the sum of the following interference interference from Fsan to the legacy base stations in operator B when Fsan is acting as an aggressor.

interference from Fsan UEs to the legacy base stations in operator B when each Fsan UE is acting as an aggressor.

Interference from Fsan system.

Whether the threshold th_LU can be satisfied under the sum of the following interference Interference from Fsan to the legacy UEs in operator B when Fsan is acting as an aggressor.

interference from Fsan UEs to the legacy UEs in Operator B when each Fsan UE is acting as an aggressor.

Interference from Fsan system.

Specifically, in FIG. 16 the sum interference InterfToLbsb1 from Fsan system to LBS_B1 is the sum of interf(Fsan, LBS_B1) and interf(F_UE,LBS_B1), the interference from Fsan system here is zero to simplify the description, i.e., $$InterfToLbsb1 = interf(Fsan, LBS\_B1) + interf(F\_UE, LBS\_B1).$$

The sum interference InterfToLue from Fsan system to L_UE is the sum of interf(FBS,L_UE) and interf(F_UE, L_UE), also the interference from Fsan system here is zero to simplify the description, i.e., $$InterfToLue = interf(Fsan, L\_UE) + interf(F\_UE, L\_UE).$$

Finally, LSDe Com will check whether InterfToLbsb1 is less than Interf_T_LB_th of operator A in FIG. 12, and whether the threshold th_LU can be satisfied under the sum interference InterfToLue.

In a step 509, if the three conditions in Step 508 are satisfied simultaneously, the inter-operator licensed spectrum access is accepted with the corresponding evaluated profile of Fsan system.

In a step 515, if the three conditions in Step 508 are not satisfied simultaneously, the licensed spectrum access is denied with the correspondingly evaluated profile of Fsan.

In a step 510, if the step 509 has been executed, the accepted Fsan profile will be registered in the REP1 and NMS1 (or REP2 and NMS2) as part of updated legacy network of operator A (or operator B) for the applied time slot.

If the allocated spectrum to Fsan is subjected to operator A, the accepted Fsan system profile will be registered in the REP1 and NMS1. Otherwise, the accepted Fsan system profile will be registered in the REP2 and NMS2.

In a step 516 if the step 515 has been executed, LSDe Com will check whether all the Fsan system profiles have been evaluated.

In a step 511, if the step 510 has been executed, the results of the Flexible Spectrum Access Evaluation will be provided from REP1 or REP2 to Fsan via LSDe Com, and then Fsan system configures itself with the evaluation and starts communication.

In a step 518, if the step 516 has been executed, and the result of the step 516 is that all the Fsan profiles have been evaluated meaning that no Fsan profile can be accommodated in the legacy sharing network. The REP1 and REP2 will stop the flexible spectrum access evaluation, and then LSDe Com informs the Fsan system that no available spectrum can be used for the available profiles.

In a step 517, if Step 516 has been executed, and the result of the step 516 is that there are some Fsan system profiles which have not been evaluated. And LSDe Com updates the previous Fsan system profile i with Fsan system profile i+1, i.e., Fsan system profile i=Fsan system profile i+1, and deliver it to the REP1 and REP2 for the next flexible spectrum access evaluation.

In a step 512, when Fsan releases the accessing spectrum, it delivers a spectrum release request to REP1 and REP2 via LDSe Com.

In a step 513, after receiving spectrum release from Fsan via LSDe Com, REP1 (or REP2) updates the REP profiles by deleting the Fsan's profile from the pre-applied geo-location and timeslot. Thus the spectrum can be released for other Fsan to access.

In a step 514, in order to guarantee Fsan is in the area of pre-set maximal displacement range D, Fsan I reports its location to LSDe Com periodically. If the Fsan is still in the pre-set area, the Fsan continues to access the allocated spectrum with the accepted Fsan profile. Otherwise, the Fsan's access is stopped to protect the legacy system. If the Fsan applies another access, it should request for flexile spectrum access again.

Referring now to FIG. 17, we present a device capable of executing a particular embodiment of the invention.

Indeed, in one embodiment of the invention, a device presented in this document (for example an access node or a fsan, or also a frequency access manager) comprises a read-only memory (ROM) 710, a random access memory (RAM) 711 and a processor 712. The read-only memory 710 is a non-transitory computer-readable carrier medium. It stores executable program code instructions, which are executed by the processor 712 in order to enable implementation of the method described above (dynamic spectrum access method), and for example:

Steps of FIG. 3 and steps of FIG. 15.

Upon initialization, the aforementioned program code instructions are transferred from the read-only memory 710 to the random access memory 711 so as to be executed by the processor 712. The random access memory 711 likewise includes registers for storing the variables and parameters required for this execution.

All the steps of the dynamic spectrum access method can be implemented equally well:

by the execution of a set of program code instructions executed by a reprogrammable computing machine such as a PC type apparatus, a DSP (digital signal processor) or a microcontroller. This program code instructions can be stored in a non-transitory computer-readable carrier medium that is detachable (for example a floppy disk, a CD-ROM or a DVD-ROM) or non-detachable; or by a dedicated machine or component, such as an FPGA (Field Programmable Gate Array), an ASIC (Application-Specific Integrated Circuit) or any dedicated hardware component.

It should be noted that the invention is not limited to a purely software-based implementation, in the form of computer program instructions, but that it can also be implemented in hardware form or any form combining a hardware portion and a software portion.

Although the present disclosure has been described with reference to one or more examples, workers skilled in the art will recognize that changes may be made in form and detail without departing from the scope of the disclosure and/or the appended claims.

In one embodiment of the invention, a profile associated to an identifying information of an access node (as a Fsan) comprises only one value or reference per feature (as depicted in the FIGS. 6 and 7). Therefore, an identifying information of an access node can be associated to several profiles.

In another embodiment of the invention, a profile associated to an identifying information of an access node comprises several potential values or references per feature. Therefore, in such embodiment, an identifying information of an access node can be associated to only one profile, but with a similar pre-defined template as depicted in the FIG. 5. One skilled in the art could modify the steps of FIGS. 3 and 15 in order to be compliant with a unique profile per access node.

The invention claimed is:

1. A method for enabling a requesting access node to use at least one radio frequency associated to at least one wireless communication network comprising at least one connected access node, wherein the method comprises, executed by a frequency access manager comprised in said wireless communication network, the following acts of:
    retrieving at least one piece of data related to a set of connected access nodes in a neighborhood of said requesting access node and related to said requesting access node, the retrieving comprising:
        obtaining at least one piece of geo-location data comprised within at least one profile associated to said requesting access node,
        determining said set of connected access nodes in the neighborhood of said requesting access node;
    determining mutual interference information between said requesting access node and said set of connected access nodes in function of said at least one piece of data related to said set of connected access nodes and related to said requesting access node; and
    transmitting, to said requesting access node, frequency access data in function of said determined mutual interference information.

2. The method according to claim 1, wherein said retrieving act comprises at least one act among the following acts:
    obtaining a supported frequency of said requesting access node comprised within at least one profile associated to said requesting access node;
    obtaining, for at least one connected access node comprised within said set of connected access nodes, an associated profile;
    obtaining at least a state parameter of said at least one wireless communication network within said neighborhood;

obtaining at least one piece of access time slot data comprised within at least one profile associated to said requesting access node.

3. The method according to claim 2, wherein the at least one profile associated to an access node comprises an attribute profile and a context profile, said attribute profile being related to a configuration of intrinsic features of said access node, and said context profile being related to a configuration of extrinsic features of said access node.

4. The method according to claim 3, wherein said attribute profile is obtained from a database comprised in said frequency access manager.

5. The method according to claim 3, wherein said context profile of said requesting access node is obtained from said requesting access node and said context profile of said at least one connected access node comprised within said set of connected access nodes is obtained from a database comprised in said frequency access manager.

6. The method according to claim 1, further comprising an act of verifying a presence of a profile associated to said requesting access node in a database comprised in said frequency access manager, said act of verifying being executed before said data retrieving act.

7. The method according to claim 6, wherein an attribute profile associated to said requesting access node being stored in the database, said method further comprises an act of delivering said attribute profile associated to said requesting access node.

8. The method according to claim 1, wherein said transmitting act comprises comparing said determined mutual interference information with at least two thresholds; if said determined mutual interference information is inferior to said at least two thresholds, said frequency access manager allows said requesting access node to use said at least one frequency.

9. The method according to claim 1, further comprising transmitting to said requesting access node, said frequency access data which enables to configure said requesting access node, and registering an information that said requesting access node is a connected access node within said at least one wireless communication network.

10. The method according to claim 1, wherein, when said requesting access node uses said at least one frequency associated to said at least one wireless communication network, the methods further comprises periodically receiving reports of at least one piece of geo-location data of said requesting access node.

11. The method according to claim 1, wherein said determining act delivering a mutual interference information comprises at least one act among the following acts:
determining an interference from said requesting access node, to said at least one connected access node;
determining an interference from said requesting access node, to at least one user equipment connected to said at least one connected access node;
determining an interference from at least one user equipment, connected to said requesting access node, to said at least one connected access node;
determining an interference from at least one user equipment, connected to said requesting access node, to at least one user equipment connected to said at least one connected access node;
determining an interference from said at least one connected access node to said requesting access node;
determining an interference from at least one user equipment connected to said at least one connected access node, to said requesting access node;
determining an interference from said at least one connected access node to at least one user equipment connected to said requesting access node;
determining an interference from at least one user equipment connected to said at least one connected access node, to at least one user equipment connected to said requesting access node.

12. The method according to claim 1, wherein said at least one frequency is associated to several wireless communication networks, and each frequency access manager comprised in a wireless communication network comprises at least one common shared device, which belongs to each of said several wireless communication networks.

13. A non-transitory computer-readable medium comprising a computer program product stored thereon, which comprises program code instructions for implementing a method enabling a requesting access node to use at least one radio frequency associated to at least one wireless communication network comprising at least one connected access node, when said program is executed on a computer or a processor of a frequency access manager comprised in said wireless communication network, wherein the instructions configure the frequency access manager to perform acts of:
retrieving at least one piece of data related to a set of connected access nodes in a neighborhood of said requesting access node and related to said requesting access node, the retrieving comprising:
obtaining at least one piece of geo-location data comprised within at least one profile associated to said requesting access node, and
determining said set of connected access nodes in the neighborhood of said requesting access node from said at least one piece of geo-location data;
determining mutual interference information between said requesting access node and said set of connected access nodes in function of said at least one piece of data related to said set of connected access nodes and related to said requesting access node; and
transmitting, to said requesting access node, frequency access data in function of said determined mutual interference information.

14. A frequency access manager of at least one frequency associated to at least one wireless communication network comprising at least one connected access node, wherein the frequency access manager comprises:
data retrieving means delivering at least one piece of data related to a set of connected access nodes in a neighborhood of a requesting access node and related to a requesting access node, said data retrieving means comprising:
means for obtaining at least one piece of geo-location data comprised within at least one profile associated to said requesting access node, and
means for determining said set of connected access nodes in the neighborhood of said requesting access node from said at least one piece of geo-location data;
determining means delivering mutual interference information between said requesting access node and said set of connected access nodes in function of said at least one piece of data related to said set of connected access nodes and related to said requesting access node; and
a transmitting means, enabling to transmit a-frequency access data in function of said determined mutual interference information, to said requesting access node.

15. The frequency access manager according to claim 14, further comprising:
- a licensed spectrum database engine, which receives said access request from said requesting access node;
- an enhanced network management system, which provides state parameter of said at least one wireless communication network to said licensed spectrum database engine;
- a radio evaluation platform, which comprises said determining means; and
- a drive test unit, which provides specific measures to said radio evaluation platform in order to enhance an accuracy of said mutual interference information;
- said licensed spectrum database engine being directly connected to said radio evaluation platform, and said enhanced network management system, and said drive text unit being directly connected to said radio evaluation platform.

\* \* \* \* \*